No. 661,566. Patented Nov. 13, 1900.
R. H. TRUITT.
CHECK ROW PLANTER AND FERTILIZER DISTRIBUTER.
(Application filed Mar. 8, 1900.)
(No Model.) 3 Sheets—Sheet 1.
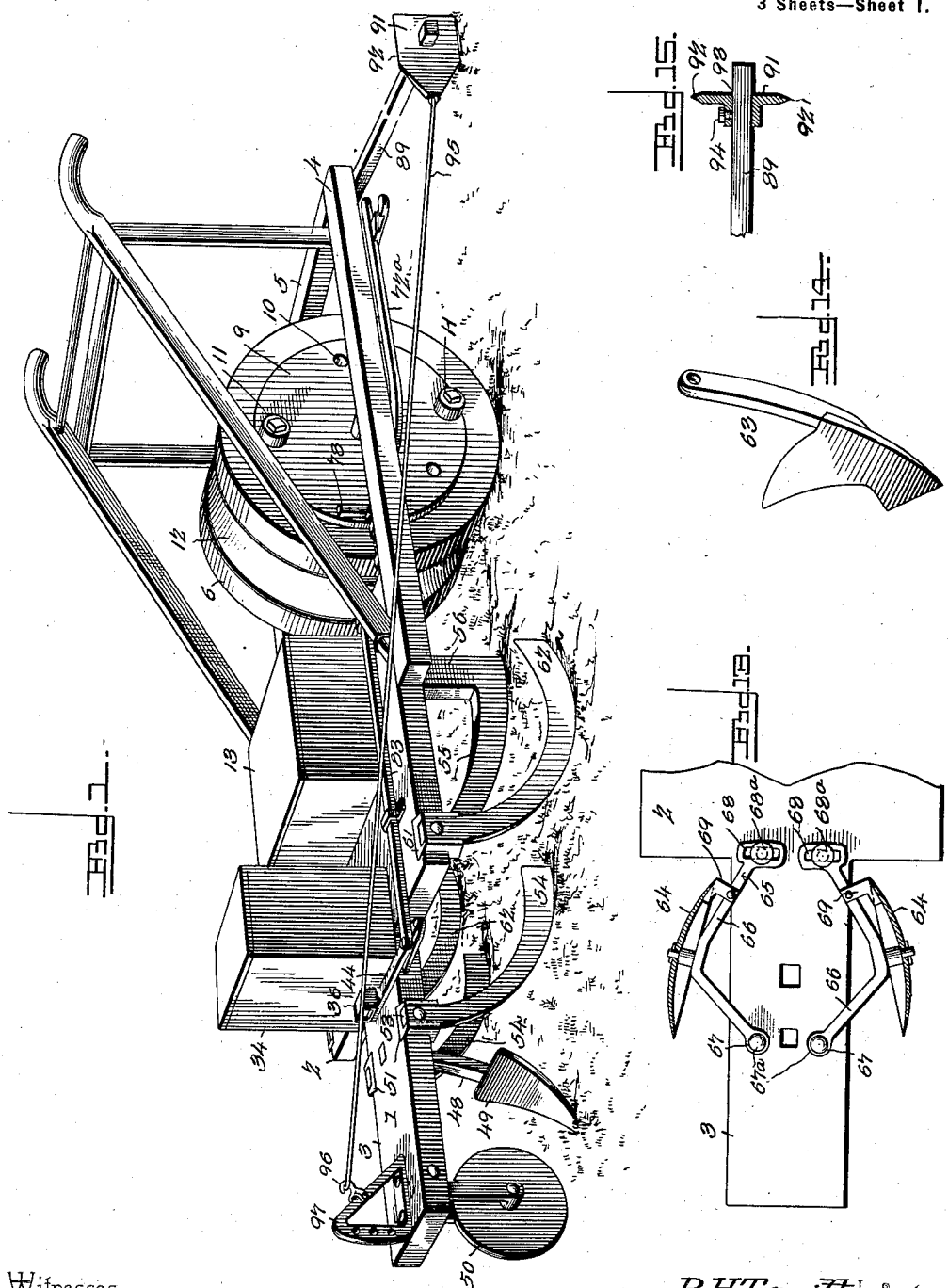
Witnesses
R. H. Truitt, Inventor
By his Attorneys, No. 661,566. Patented Nov. 13, 1900.
R. H. TRUITT.
CHECK ROW PLANTER AND FERTILIZER DISTRIBUTER.
(Application filed Mar. 8, 1900.)
(No Model.) 3 Sheets—Sheet 2.
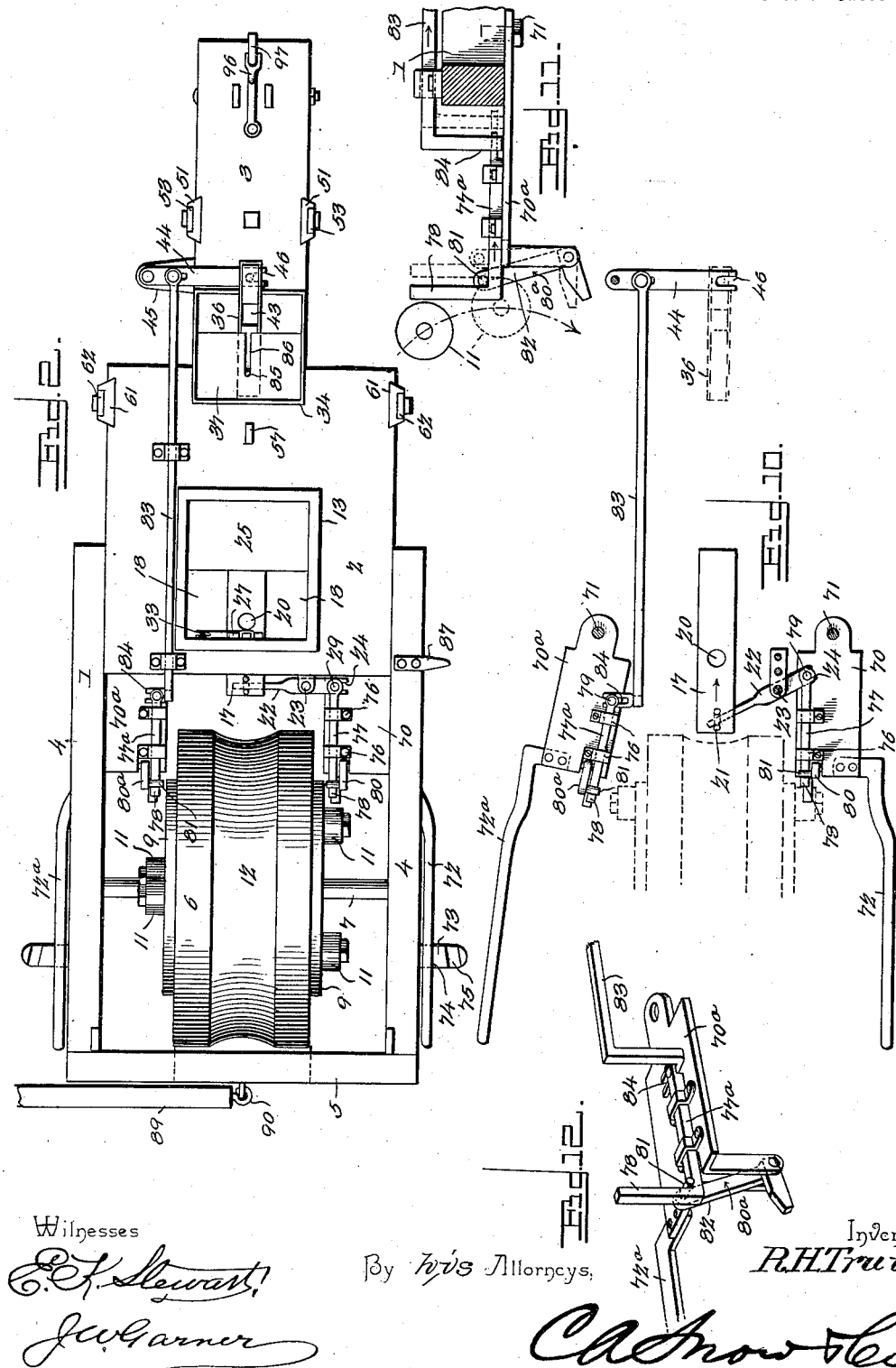
Witnesses
Inventor
R. H. Truitt
By his Attorneys, No. 661,566. Patented Nov. 13, 1900.
R. H. TRUITT.
CHECK ROW PLANTER AND FERTILIZER DISTRIBUTER.
(Application filed Mar. 8, 1900.)
(No Model.) 3 Sheets—Sheet 3.
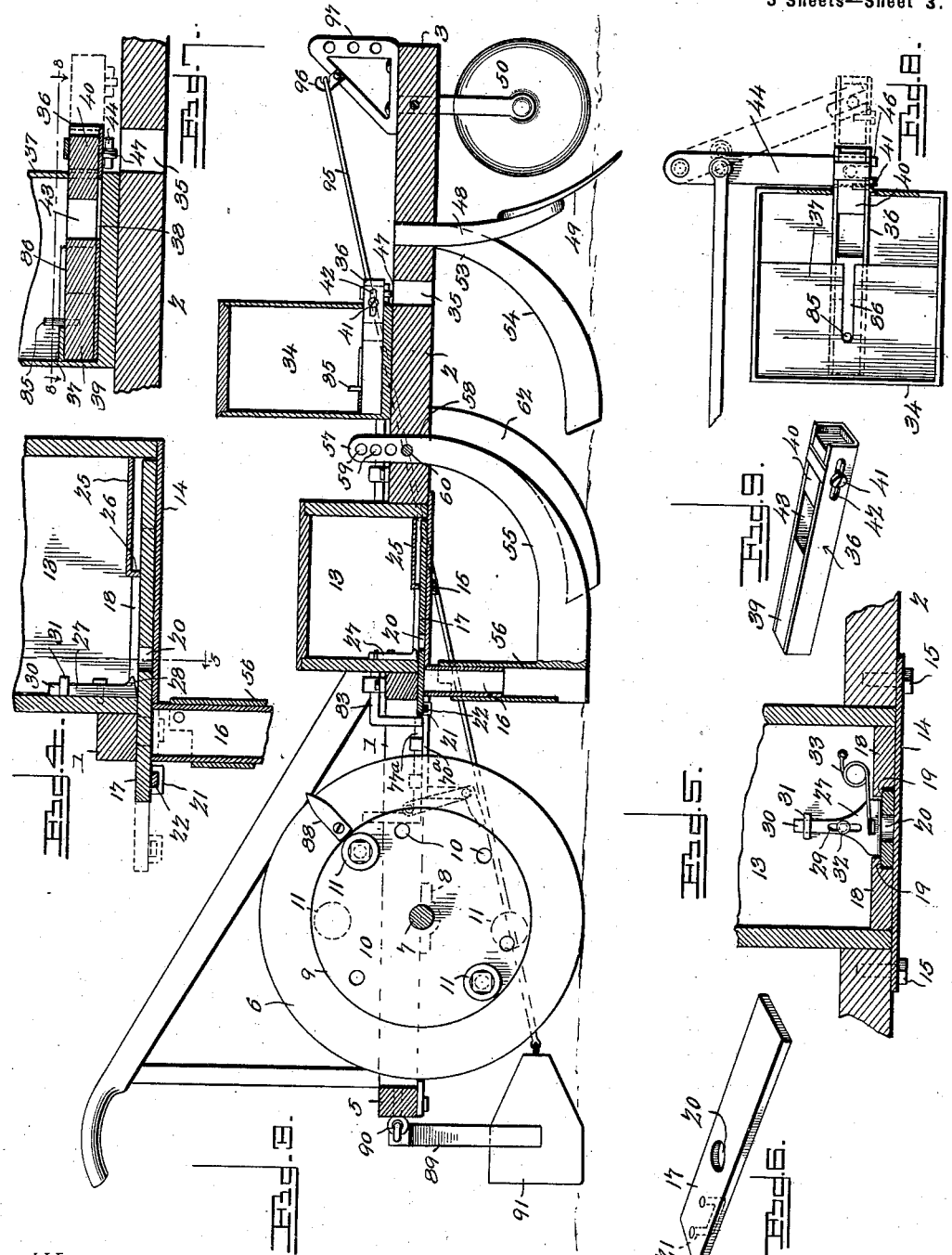
Witnesses
By his Attorneys,
Inventor
R. H. Truitt

UNITED STATES PATENT OFFICE.

ROBERT HENRY TRUITT, OF BENTON, KENTUCKY.

CHECK-ROW PLANTER AND FERTILIZER-DISTRIBUTER.

SPECIFICATION forming part of Letters Patent No. 661,566, dated November 13, 1900.

Application filed March 8, 1900. Serial No. 7,862. (No model.)

*To all whom it may concern:*

Be it known that I, ROBERT HENRY TRUITT, a citizen of the United States, residing at Benton, in the county of Marshall and State of Kentucky, have invented a new and useful Check-Row Corn-Planter and Fertilizer-Distributer, of which the following is a specification.

My invention is an improved combined check-row corn-planter and fertilizer-distributer.

One object of my invention is to provide a novel construction and combination of mechanism for actuating the seed and fertilizer slides.

A further object of my invention is to provide an improved cut-off shoe or plate for the seed-slide.

A further object of my invention is to provide an improved form of fertilizer-slide which is adapted to be adjusted so as to regulate the quantity of fertilizer distributed to each hill of corn.

A further object of my invention is to provide an improved novel form of shoe or furrow-opener which is adapted to be set to any required adjustment.

A further object of my invention is to provide an improved form of marker.

A further object of my invention is to provide improved pulverizing-disk devices for operation in connection with the corn-planter.

With these and other objects in view my invention consists in the peculiar construction and combination of devices hereinafter set forth, and pointed out in the claims.

In the accompanying drawings, Figure 1 is a perspective view of a combined check-row corn-planter and fertilizer-distributer embodying my improvements. Fig. 2 is a top plan view of the same. Fig. 3 is a vertical longitudinal sectional view of the same. Fig. 4 is a vertical sectional view in detail, on a somewhat-larger scale, of the seed-hopper, seed-slide, cut-off plate or shoe, and a portion of the tubular telescoping standard of the furrow-opening shoe. Fig. 5 is a detail transverse sectional view taken on the line 5 5 of Fig. 4. Fig. 6 is a detail perspective view of the seed-slide. Fig. 7 is a detail central longitudinal sectional view of a portion of the fertilizer-hopper and the fertilizer-slide therein. Fig. 8 is a detail top plan view of the same, partly in horizontal section, on the line 8 8 of Fig. 7. Fig. 9 is a detail perspective view of the fertilizer-dropping slide. Fig. 10 is a diagrammatic top plan view of the mechanism for actuating the seed and fertilizer slides, showing the same in operative position with relation to said slides and to the roller from which power is supplied. Fig. 11 is a detail side elevation of one of the slide-actuating mechanisms. Fig. 12 is a detail perspective view of the same. Fig. 13 is an inverted plan view, partly in section, of the pulverizing-disks and their supporting devices. Fig. 14 is a detail perspective view of a covering-plow adapted to be used in lieu of the runners or disks. Fig. 15 is a detail sectional view of the furrow-maker.

The frame 1 of my improved combined check-row corn-planter and fertilizer-distributer comprises a platform 2, having a forward-extending beam 3 and a pair of rearward-extending bars 4, which have their rear ends connected together by a cross-bar 5. A roller 6, which supports the rear end of the frame and from which power is derived for the slide-actuating mechanisms, has its supporting-shaft 7 journaled in bearings with which the bars 4 are provided, as at 8, (illustrated in dotted lines in Fig. 3,) and said roller is provided on its sides or ends with circular disks 9, each of which has a series of adjusting and spacing openings 10, adapted for the attachment of tappet-rollers 11. The said roller is further provided with a central peripheral concaved groove 12, which travels in rear of the planting mechanism in the furrow and serves to lightly press the soil on the seeds and to form a slight ridge over the planted seed.

A bottomless seed-hopper 13, which is preferably of the form here shown, but which may be of any other suitable form, has its lower side located in an opening with which the platform 2 is provided, near the rear end of said platform. The said opening is covered on the under side thereof by means of a bottom plate 14, which is bolted or otherwise suitably secured to the under side of the platform, bolts 15 being here indicated to thus secure the said bottom plate in position. Said bottom plate at its rear side abuts against the upper end of the seed-tube 16, which depends vertically from the platform and is located just in rear of the hopper 13. A seed-slide 17 is arranged centrally on the plate 14 and passes through the rear side of the hopper, as shown, and on the sides of said seed-slide are located plates 18, which form a false bottom in the hopper, and are provided on their opposing edges with rabbets 19, which form guides for the sides of the seed-slide. Said slide is provided with a seed-opening 20, of suitable size, adapted to receive any desired predetermined number of grains of corn. When the said seed-slide is reciprocated by mechanism hereinafter described, the said opening 20 alternately registers with the seed-tube 16 and the interior of the hopper, as will be readily understood, and thereby serves to convey seed from the hopper to the said seed-tube on each rearward movement of the said seed-slide. The latter is provided on its under side, near its rear end, with a yoke 21, of suitable form, which is engaged by a link-lever 22. Said link-lever is mounted and fulcrumed in a suitable support 23, and the outer end thereof is forked or bifurcated, as at 24. A plate 25 is transversely disposed in the seed-hopper, at the front side thereof, and bears upon the upper sides of the plates 18 and spans the space between said plates over the seed-slide, and said plate 25 is provided on its rear side with a downturned flange 26, which bears upon said seed-slide, as shown. On the inner side of the rear wall of the seed-hopper is a vertically-disposed cut-off plate or shoe 27, which bears upon the upper side of the seed-slide. The lower side of said shoe or cut-off plate is widened and thickened, as shown, and has its lower edge beveled at a suitable angle, as at 28, and said cut-off is provided with a vertical slot 29, and its upper extending arm 30 passes through a guide 31. By this construction and combination of devices the cut-off plate is adapted for vertical movement, a screw or pin 32 working in the slot 29. A spring 33 bears downward on the cut-off plate and keeps the same normally in contact with the upper side of the seed-slide. In the event, however, that the cut-off plate should fail to remove superfluous grains of corn from the cup or opening 20 as the same moves under the cut-off plate on the rear stroke of the seed-slide said cut-off plate is adapted to yield in a vertical direction and allow said opening or cup to pass under the same without injury either to the seed-slide, cut-off plate, or actuating mechanism and without exerting shearing or cutting action on any of the grains of corn.

At a suitable distance in advance of the seed-hopper is a fertilizer-hopper 34, the same being located immediately in rear of an opening 35 in the platform. A fertilizer-slide 36 is guided in a suitable longitudinal groove in the bottom of the hopper, the front end of said fertilizer-slide extending through the front side of the hopper, as shown. A transversely-disposed plate 37 in the bottom of the hopper partly covers the slide 36. Said slide comprises a metallic trough 36, which is rectangular in cross-section and has an opening 38 in its lower side at a suitable distance from its front end. The interior portion of the said trough of the slide in rear of the said opening 38 is filled by a suitable block 39, which is secured between the side walls of the said trough, and in the front portion of the said trough, between the vertical side walls thereof, is disposed an adjusting-block 40. A set-screw 41 travels in a longitudinal slot in one of the side walls of said trough and engages said adjusting-block 40, and hence said adjusting-block is adapted to be moved endwise in the said trough, so as to open or uncover the opening 38 to its full extent or to partly cover the said opening 38 to any desired extent, and thereby vary the size of the fertilizer-opening 43, formed between the proximate ends of the blocks 39 40. By thus varying the size of the said opening 43 by setting said block 40 at any desired adjustment the slide is adapted for distributing any desired predetermined quantity of fertilizer at each operation. It will be understood that when the fertilizer-slide moves forward the opening 43 therein registers with the opening 35, and hence the fertilizer contained in said opening 43 will be dropped through the opening 35 into the furrow. A link-lever 44 is pivoted at its outer end on a bracket 45, which projects from one side of the forward-extending beam 3, and the inner end of said link-lever is forked or bifurcated, as at 46, and engages a stud 47, that depends from the front portion of the fertilizer-slide.

A plow-stock or standard 48, of suitable construction, is suitably secured in the beam 3 and depends centrally therefrom and is provided with a suitable furrow-opening tongue or shovel 49. In advance of the said standard 48 is a revolving disk colter 50, which operates in advance of the furrow-opener and is useful on foul land, but may be detached from the beam 3 when not required. Metallic blocks 51 are disposed in vertical recesses in the sides of the beam 3, said blocks being abreast of the standard 48, and said blocks are provided with vertical open grooves in their outer sides, which form the seats for the upper extended shanks or stocks 53 of covering-wings or runners 54, which are adapted to sweep the loose earth on the sides of the furrow into the same as the machine advances, and thereby cover the fertilizer dropped in the furrow.

The corn-furrowing shoe or runner 55 has a vertical tubular stock 56 at its rear end, which telescopes on the seed-tube 16, and said shoe or runner is provided at its front end with a vertical arm 57, which passes through an opening 58 in the platform and is adapted to play vertically therein, so as to set the shoe or runner to any desired vertical adjustment, and hence regulate the depth of the furrow made thereby and the depth at which the seed is deposited therein. Said arm 57 has a series of adjusting-openings 59, one of which is engaged by a set-bolt 60, which serves to secure said runner or shoe when adjusted.

Metallic blocks 61, which are similar in construction to the blocks 51, are secured in the sides of the platform substantially abreast of the front end of the shoe or runner 55, and in the said blocks are secured or adapted to be secured covering-wings 62, which are identical in construction with the covering-wings hereinbefore described and which serve to cover the seeds in the furrow, as will be readily understood.

In Fig. 14 I have illustrated a form of covering-shovel 63 which may be substituted for the covering-wings 54 62, if preferred, and which are especially adapted for operation in land which has not been thoroughly prepared by furrowing and harrowing prior to the planting thereof.

In Fig. 13 I illustrate suitable covering-disks and supporting connections therefor, which disks may be employed in lieu of the covering-wings or covering shovels or plows hereinbefore described. The said covering-disks 64 are of the usual concavo-convex form and are mounted on novel supports 65, which form a part of my invention. Said supports 65 comprise metallic arms 66, preferably bent in the form here shown, but which may be of other suitable form, and are provided at their front ends with pivotal openings 67 and at their rear ends with adjusting-slots 68, which are concentric with said openings 67. Bolts 67ª 68ª in said openings and slots, respectively, serve to secure the said supports to the under side of the beam or platform, as the case may be, and the rear ends of the said supports are laterally adjustable, so that the said covering-disks may be set at any required angle with relation to each other, as will be readily understood. Scrapers 69 are bolted to the supports 65 and are disposed within the concaved or inner sides of the disks 64 and serve to keep the same clear of adhering earth.

I will now describe my novel form of mechanism for actuating the fertilizer and seed slides. On one side of the platform, as here shown the right-hand side thereof, is a supporting-plate 70, which is pivoted at its front end, as at 71. Said plate is preferably of the form here shown, but may be of any other suitable form, and is provided at its rear end with a shifting-lever 72, by means of which said plate may be moved on its pivot. Said shifting-lever engages a detent-bracket 73, which supports the rear end thereof and incidentally supports the rear end of plate 70, said detent-bracket being provided with notches 74 75, adapted to receive said lever. On the plate 70 and supported in guides 76 is a reciprocatory push-rod 77, which has a vertical arm 78 at its rear end and is provided at its front end with a depending stud 79, which is engaged by the fork or bifurcation 24 at the outer end of the link-lever 22. A crank-lever 80 is fulcrumed to a bracket which projects from the lower side of the plate 70, and said crank-lever has a laterally-projecting stud 81 on one side of its upper arm 82, the lower arm of said crank-lever extending into the path of the tappets on the right-hand side of the roller 6 and adapted to be engaged successively by said tappets as said roller rotates. The vertical arm 78 of the push-rod 77 is also disposed in the path of the said tappets of the said roller, and said arm is engaged on its front side by the stud 81, whereby the said crank-lever is caused to engage and move said push-rod rearward when said crank arm or lever is engaged by the tappets.

It will be understood from the foregoing and by reference to the drawings that as the roller rotates one of its tappets will first engage the arm 78 of push-rod 77, thereby moving said push-rod forward and communicating retrograde movement to the seed-slide 17 through the lever 22. This movement of the push-rod imparts a partial rotation to the crank-lever 80, which is adapted to rock on its pivot, thereby causing the lower rearward-extending arm of said rocking crank-lever to be disposed in the path of the tappet, and as the latter clears the push-rod it immediately thereafter engages the rocking crank-lever and causes the latter to return the push-rod to its initial position, hence imparting reciprocatory motion to the seed-slide, the push-rod 77 being positively impelled forward on one stroke thereof directly by the tappet and its retrograde impulse being received from the tappet through the rock-lever. When the lever 72 of plate 70 is in engagement with the notch 74 of bracket-arm 73, the said plate 70 is locked in the position shown in Figs. 2 and 10, so that the push-rod and rocking lever are in the path of the roller-tappets, and the seed-planting mechanism is operated as hereinbefore described; but when the said lever 72 is engaged by the notch 75 the plate 70 is swung outward, so as to carry the rear ends of the push-rod 77 and rocking crank-lever laterally to one side of and out of engagement with said roller-tappets, and hence the seed-planting mechanism is thrown out of gear and ceases to operate. The actuating mechanism for the fertilizer-slide is identical in construction and operation with the seed-slide-actuating mechanism hereinbefore described and is located on the left-hand side of the platform and adapted to be operated by the tappets on the corresponding side of the roller. The plate 70ª, lever 72ª, push-rod 77ª, and rocking crank-lever 80ª are identical in construction and mode of operation with those of the corresponding parts 70, 72, 77, and 80. Said operating mechanism for the fertilizer-slide is connected to the lever 44 by a rod 83, having a laterally-extended forked arm 84 at its rear end adapted for engagement by the stud which depends from the front end of the push-rod 77ᵃ, and hence said fertilizer-slide may be thrown into or out of operation at the will of the operator. The fertilizer-slide is provided on its upper side with a stirring-stud 85, which travels in an open slot 86 with which plate 37 is provided and serves to stir the fertilizer in the fertilizer-hopper and prevents the fertilizer from becoming packed therein, as will be readily understood. The tappet-rollers on the opposite sides of the roller 6 are so located that as the machine advances the fertilizer is dropped at the same points with the corn, and by varying the number of tappet-rollers employed and appropriately spacing them apart the seed and fertilizer slides may be operated so as to cause the corn to be planted and fertilized either in drills or in hills, as may be required. An indicator 87 on the frame at a point abreast of the seed spout or tube indicates, when the same is in line with a mark in the adjacent planted furrow made by a marker 88 with which the roller is provided, the location of the hill, said marker 88 marking the ground on one side of each hill as the machine advances, and hence the hills of corn as the same are planted may be readily checked and adapted to be cultivated both in line with the rows formed by the machine and at right angles thereto, as will be readily understood.

In order to gage the furrows planted with corn and enable the same to be run in parallel lines and at regular distance apart, I provide my planter with a furrow-marker which comprises a bar 89, the inner end of which is pivotally connected on the rear side of the cross-bar 5, at the center thereof, as at 90, and a runner 91, the latter having marking edges 92 on both sides and a central opening 93, through which the bar 89 extends, said runner being adapted to be laterally adjusted on said bar and provided with a set bolt or screw 94, whereby it may be secured on the bar 89 at any desired adjustment. A trail rope or cord 95 connects the front end of the runner 91 with a hook 96 on a clevis 97 at the front end of the beam 3. The said marker may be disposed and caused to operate on either side of the planter as may be required by turning the bar 89 on its pivot 90.

In the practical equipment of my improved corn-planter I provide the same with a number, usually four, of interchangeable seed-slides having from one to four openings, respectively, and the said openings being each adapted to contain a single grain of corn. Hence by using a seed-slide having an appropriate number of openings the corn-planter may be readily adapted for planting any desired number of grains of corn in each hill. In the seed-slide herein shown only one opening is indicated, and it has not been deemed necessary to show slides having more than one opening, as the description herein is thought to be clear as to this feature of the invention.

Having thus described my invention, I claim—

1. The combination with a seed or fertilizer slide, of a reciprocatory element connected thereto, to move said slide in one direction and having a tappet-arm, a retracting rocking element connected to said reciprocatory element and having a tappet-arm, and a revoluble element having tappets (one or more) in the path of which the said tappets of said reciprocatory and rocking elements are disposed and by which said tappets of said reciprocatory elements are successively engaged.

2. In combination with a revoluble element having tappets, a reciprocatory push-bar connected to a seed or fertilizer slide and having an arm disposed in the path of a tappet and moved thereby in one direction, and a retracting bell-crank lever connected to said push-bar and having an arm disposed in the path of the tappet and operated thereby after the tappet has cleared the arm of the push-bar, substantially as described.

3. In combination with a revoluble element having tappets, a reciprocatory element connected to a seed or fertilizer slide, adapted to be disposed in the path of a tappet and moved thereby in one direction, and a rocking element connected to said reciprocatory element and having an arm disposed in the path of the tappet and operated thereby after the tappet has cleared the reciprocatory element, and a movable support for said reciprocatory and rocking elements whereby the same may be moved out of the path of the tappets, substantially as described.

4. In combination with a revoluble element having tappets, a reciprocatory element connected to a seed or fertilizer slide, adapted to be disposed in the path of a tappet and moved thereby in one direction, and a rocking element connected to said reciprocatory element and having an arm disposed in the path of the tappet and operated thereby after the tappet has cleared the reciprocatory element, a pivoted support for said reciprocatory and rocking elements and means for moving and locking said pivoted support whereby said reciprocatory and rocking elements may be secured in or out of the path of the tappets, substantially as described.

5. In a planter, the combination of a hopper having a transversely-disposed and slotted plate in the bottom thereof, a slide comprising a trough having a discharge-opening in its lower side, said trough being guided in the bottom of the hopper, under the slotted plate, and having blocks on opposite sides of the discharge-opening, one of said blocks being adjustable, and the other having a stirring-pin operating in the slot in the plate, and means to reciprocate said slide, substantially as described.

6. In a planter, the combination with a seed-tube, of a vertically-adjustable furrow-opening shoe or runner having a tubular standard telescoping on said seed-tube, said shoe or runner provided at its front end with a vertical arm extending through a vertical guide-opening in the frame of the planter and means for securing said arm to the frame of the planter at any adjustment of the shoe, substantially as described.

7. The combination with a seed or fertilizer slide, of a reciprocatory push-rod having a tappet at one end, a link-lever connecting said push-rod to said slide, a retracting bell-crank lever disposed below the outer end of said push-rod and engaging and adapted to move said push-rod in one direction, and a revoluble element having tappets (one or more) to engage said tappet of said push-rod and move the same in one direction and thereafter engage said bell-crank lever and cause the latter to return the push-rod to its initial position, substantially as described.

8. A covering device for planters, comprising a pair of supporting-bars adapted to be pivoted at their front ends and having adjusting-slots at their rear ends concentric with said pivots, covering-disks mounted on the outer sides of said supporting-bars, and the scrapers on said supporting-bars and engaging the inner sides of the covering-disks.

In testimony that I claim the foregoing as my own I have hereto affixed my signature in the presence of two witnesses.

ROBERT HENRY TRUITT.

Witnesses:
ROBT. L. SHEMWELL,
L. E. WALLACE.